United States Patent [19]

Morinaga

[11] 4,201,078
[45] May 6, 1980

[54] HORIZONTAL-TYPE HEAD FORM IMPACT TESTER

[75] Inventor: Masaru Morinaga, Toyota, Japan

[73] Assignee: Toyota Jidosha Kogyo Kabushiki Kaisha, Toyota, Japan

[21] Appl. No.: 952,197

[22] Filed: Oct. 17, 1978

[30] Foreign Application Priority Data

Oct. 19, 1977 [JP] Japan .................. 52-140245[U]

[51] Int. Cl.$^2$ .............................................. G01N 3/30
[52] U.S. Cl. ................................... 73/12; 73/432 SD
[58] Field of Search ................ 73/12, 13, 432 SD; 92/134, 135

[56] References Cited

U.S. PATENT DOCUMENTS 2,001,087   5/1935   Abramson ........................ 73/12

OTHER PUBLICATIONS

Zeger, L. Test Instrumentation ... Data, by Associated Testing Laboratories, Inc., Wayne, N. J., 4 pp. Sep. '67.

Primary Examiner—Jerry W. Myracle
Attorney, Agent, or Firm—Stevens, Davis, Miller & Mosher

[57] ABSTRACT

A horizontal-type head form impact tester comprising a cylindrical ram support having front, middle and rear walls and air inlets, a ram supported by the ram support, a cylinder connected to the ram support and a cannon-ball-like head form slidably received within the cylinder and adapted to be shot when the ram is pushed forward. The ram is maintained stationary when two air pressures within the ram support are equal, but slid forward when the equality of the air pressures is lost by the introduction of compressed trigger air into the ram support. The head form is separated from the ram and when an impact test is made, the head form runs against an object to be tested, apart from the ram.

3 Claims, 6 Drawing Figures

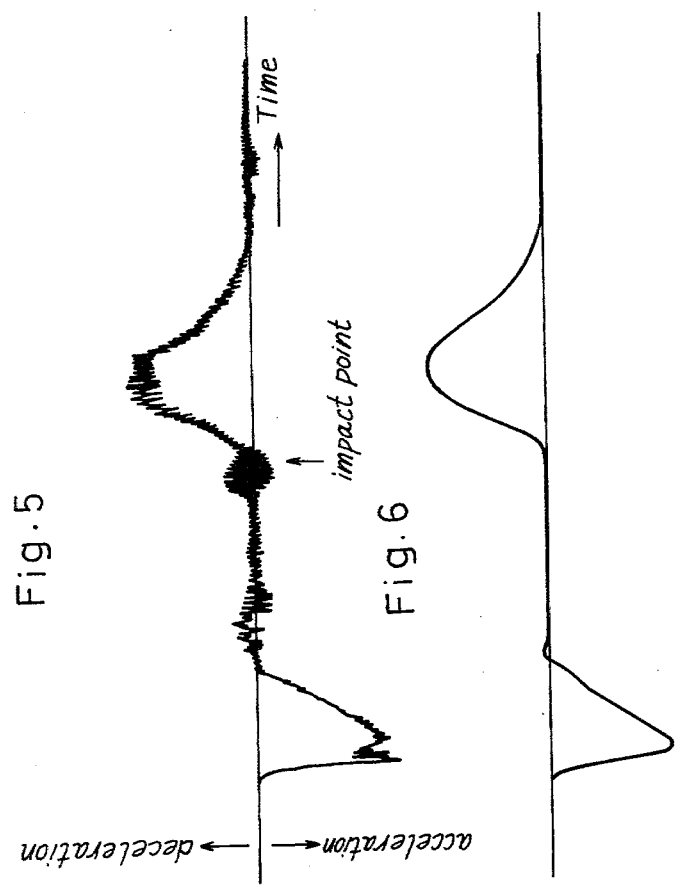

HORIZONTAL-TYPE HEAD FORM IMPACT TESTER

The present invention relates to improvements in a horizontal-type head form impact tester used for measuring the shock-absorbing capacities of the inside parts of an automobile.

A horizontal-type head form impact tester is in current use as a device for measuring the shock-absorbing capacities of the inside parts of an automobile by pushing out a head form (diameter: 6.5 inches weight: 15 pounds), shaped like a human head, in a horizontal direction in a shocking manner. As shown in FIG. 3, the conventional head form impact tester is manufactured with a head form 31 formed integrally with a ram 32. In the conventional impact tester, therefore, the effective weight of the head form 31 is restricted and when the projecting length of the ram 32 need be increased, the length of the ram 32 must be increased since the shape of the head form 31 cannot be changed. In case the whole of the head form and ram is long, it is not possible to increase the natural vibration frequency of the combined head form and ram by modifying a ram support 33 since the number of longitudinal vibrations of the rod-like object is reversely proportional to its length. The conventional tester has been fatally defective, therefore, in that there is apt to overlap the frequency range of vibrations produced at the test portion by the head form impact tester and that of the natural vibrations of the head form.

An object of this invention is therefore to considerably increase the natural vibration frequency of a head form and prevent any overlapping of the frequency range of vibrations produced at the test portion by the head form impact and that of the natural vibrations of the head form even if the vibrations of the test portion are large in number.

Another object of this invention is to increase the rigidity and durability of head forms.

Further objects of this invention will become apparent upon a reading of the following detailed description of the invention and drawings which disclose:

FIG. 5 is a graph showing the results of measurement of shock absorbing capacities by the conventional tester shown in FIGS. 3 and 4.

FIG. 6 is a graph showing the results of measurement of shock-absorbing capacities by the tester according to the invention.

Before explaining the invention in detail, it is to be noted that the left and right sides of FIGS. 1 to 4 will be referred to as "forward and backward parts" or the like terms, respectively.

Figure 1:
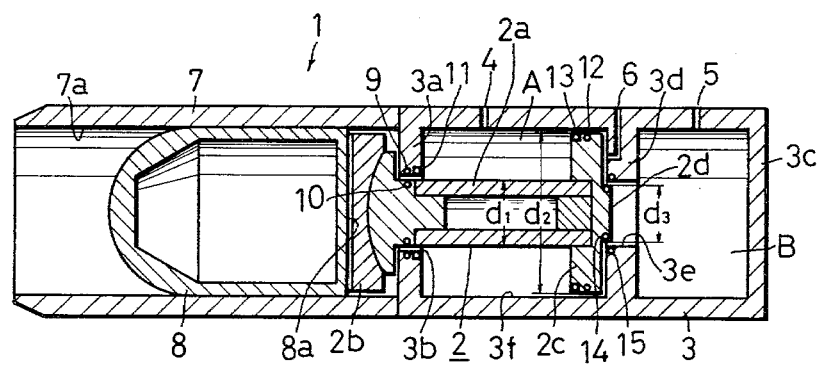
FIG. 1 is a vertical cross sectional view of a horizontal-type head form impact tester according to this invention with the head form not being shot.
Figure 2:
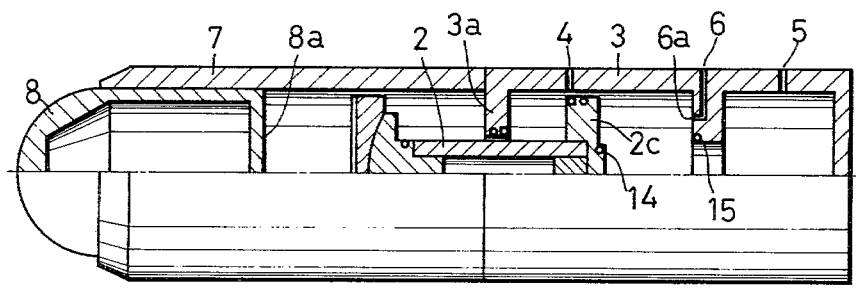
FIG. 2 is a vertical cross sectional view of the upper portion of the tester shown in FIG. 1 with the head form being shot.
Figure 3:
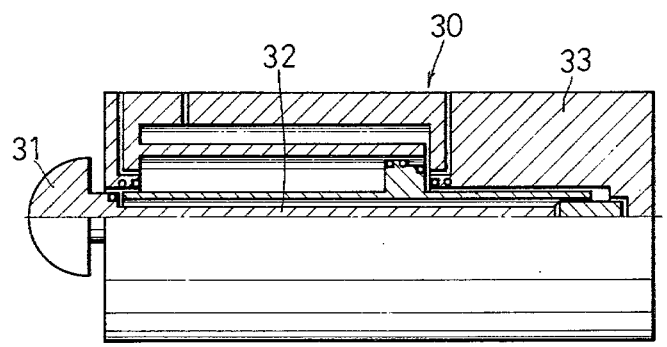
FIG. 3 is a vertical cross sectional view of the upper portion of the conventional horizontal-type head form impact tester with the head form not being shot.
Figure 4:
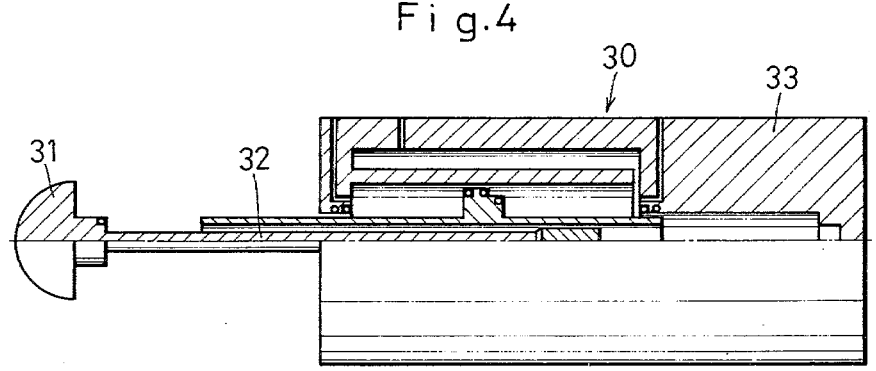
FIG. 4 is a vertical cross sectional view of the upper portion of the conventional tester shown in FIG. 3 with the head form being shot.

Referring to the drawings, FIGS. 1 and 2 illustrate a horizontal-type head form impact tester 1 according to the invention. The tester 1 includes a head form 8 received within a cylinder 7 and a ram 2 consisting of a front flange 2b, rod element 2a and rear flange 2c and supported by a cylindrical ram support 3. The ram support 3 forms the backward part of the tester 1 and has a front wall 3a, middle wall 3d and rear wall 3c. The front and middle walls 3a and 3d have axial holes 3b and 3e, respectively. The rod element 2a of the ram 2 is supported by the axial hole 3b of the front wall 3a. The diameter d2 of the front ram flange 2b is larger than that d1 of the rod element 2a and slightly smaller than the inner diameter of the ram support 3. The rear ram flange 2c has substantially the same diameter as the front ram flange 2b. The rear surface of the rear ram flange 2c is provided with a slightly projecting portion 2d having a slightly smaller diameter d3 than the axial hole 3e of the ram support 3. The diameter of the axial hole 3e is substantially the same as that of the other axial hole 3b.

The ram support 3 has an air inlet 4 between the front and middle walls 3a and 3d and another air inlet 5 between the middle and rear walls 3d and 3c. The ram support 3 is further provided with an air inlet 6 which passes through a portion of the middle wall 3d and has an end 6a opening forwardly of the tester 1 at a location nearer to the cylindrical ram support wall than the axial hole 3e.

The rear ram flange 2c is positioned between the front and middle walls 3a and 3d of the ram support 3 and is travelable there between. When the rear ram flange 2c has come into contact with the middle wall 3d, a space exists between the front ram flange 2b and the front wall 3a of the ram support 3.

The front wall 3a of the ram support 3 is provided with a seal 9 and a bearing 11 at a location adjacent to the rod element 2a of the ram 2. A seal 10 is also provided in the rod element 2a of the ram 2. Airtightness is therefore maintained between the front wall 3a and rod element 2a by the presence of these seals 9 and 10. The bearing 11 supports the rod element 2a in a slidable manner. The rear ram flange 2c is provided with both seal 12 and bearing 13 which maintains airtightness betwen the rear flange 2c and the cylindrical wall of the ram support 3 and enables the rear flange 2c to slide, respectively.

The cylinder 7, being open at both ends, is connected to the ram support 3. The cylinder 7 is coaxial with the ram support 3 and slidably supports the head form 8 by its inner surface. The head form is a cylindrical hollow member having a round top and a flat rear wall 8a perpendicular to the axis of the head form 8. The head form 8 is separated from the ram 2 and it is possible to set the natural vibration frequency of the head form 8 as desired, independently of the ram 2.

When the tester is not in operation, the ram support 3 is divided into two chambers, that is, a front chamber A surrounded by the inner surface of the support 3, front surface of the rear ram flange 2c and outer surface of the rod element 2a and a rear chamber B surrounded by the inner surface of the support 3 and projecting portion 2d of the ram 2.

Attention is next directed to the operation of the tester 1. Compressed air is allowed to enter the front chamber A through the air inlet 4 and moves the ram 2 backward causing the rear ram flange 2c to press against the middle wall 3d of the ram support 3.

The head form 8 is then moved backward so as to come into contact with the rear ram flange. Compressed air is allowed to enter the rear chamber B through the air inlet 5. Assuming that no compressed air is allowed to enter the front chamber A, the compressed air introduced into the rear chamber B has a force to move the ram 2 forward.

When the air pressures in the front and rear chambers A and B are P1 and P2, respectively, the air pressure applied to each of the front surface and rear projecting surface 2d of the rear ram flange 2c is $\pi/4(d2^2-d1^2)\times P1$ and $\pi/4d3^2\times P2$, respectively. Since the two air pressures P1 and P2 have been equalized ($\pi/4(d2^2-d1^2)\times P1=\pi/4d3^2\times P2$), the rear ram flange 2c remains pressed against the middle wall 3d of the ram support 3 when the compressed air has entered the rear chamber B.

Compressed air is further allowed to enter the ram support 3 through the air inlet 6. Flowing out of the forwardly opening end 6a of the air inlet 6, the compressed air or trigger air strikes the rear surface of the rear ram flange 2c. When the air pressure is P3, the area receiving the air pressure is $\pi/4(d2^2-d3^2)$ and the whole air pressure applied to the rear surface of the rear ram flange 2c is $\pi/4(d2^2-d3^2)\times P3$.

The introduction of the trigger air causes the compressed air in the front and rear chambers A and B to lose the equality of the pressure, with the result that the ram 2 slightly moves forward and away from the contact with the middle wall 3d of the ram support 3 with the projecting portion 2d of the ram 2 moving away from the axial hole 3e of the middle wall 3d. This further cuases the air pressure P2 in the rear chamber B to act upon the entire rear surface of the rear ram flange 2c, so that the air pressure P2 to the rear surface of the rear flange 2c becomes greater suddenly than the air pressure to the front surface of the rear flange 2c to make the ram 2 move forward suddenly and shoot the head form 8 with a great force. The head form 8 thus runs through the cylinder 7 and projects therefrom at a high speed.

The movement of the ram 2 further compresses the compressed air within the front chamber A and when the rear ram flange 2c has moved forward past the air inlet 4, the ram 2 stops moving forward due to the compressed air. Thus the rear ram flange 2c does not come into contact with the front flange 3a of the ram support 3.

When the tester 1 is used for impact tests of an instrument panel, head restraint, the back of the back seat or the like in an automobile, the tester 1 is positioned horizontally with the head form side directed to the test part of the automobile. The air pressures P1 and P2 in the chamber A and B are equalized. When compressed air (trigger air) is then introduced into the tester 1 through the air inlet 6, the head form 8 runs through the cylinder and against the test part (FIG. 2).

FIGS. 5 and 6 show the results of impact tests using the conventional head form impact tester and the present one, respectively. In FIG. 5, the form of the wave (of the vibrations produced at the test part) to be measured is vague since the wave form of the vibrations of the head form has lied upon that of the vibrations of the test part due to an overlapping of the frequency range of the natural vibrations of the head form and that of the vibrations of the test part, while the impact acceleration represented by a solid line in FIG. 6 could otherwise have been measured. On the contrary, the use of the tester of the invention makes it possible to clearly distinguish the form of the wave to be measured from that of the natural vibrations of the head form as shown in FIG. 6 since the natural vibrations of the head form is increased in number. It is also possible to erase any wave form of the natural vibrations of the head form which may obstruct the measurement of the vibrations of the test part by allowing it to pass through a low-pass filter.

what I claim is:

1. A horizontal-type headform impact tester comprising:
   a cylindrical ram support having a front wall with an axial hole, a closed rear wall and three air inlets, the first of which is for set air, the second of which is for load air and the third of which is for trigger air;
   a ram separate from and supported by said ram support;
   a cannonball-like headform slidably received within said cylinder and adapted to be shot from said cylinder when said ram is pushed forward;
   said ram being maintained stationary when set air pressure is equal to load air pressure within said ram support, but slid forward when the equality between the set and load air pressures is lost by the introduction of compressed trigger air through the third inlet into said ram support.

2. The tester of claim 1 wherein said head form is hollow.

3. The tester of claim 1 wherein said ram support has a middle wall provided with an axial hole which divides said ram support into a front chamber into which the set air and the trigger air are introduced through the first and third inlets, respectively, and a rear chamber into which the load air is introduced through the second inlet, said front chamber being adapted to house the rear portion of said ram.

* * * * *